United States Patent
Lame

(10) Patent No.: US 9,302,828 B2
(45) Date of Patent: Apr. 5, 2016

(54) DEVICE FOR DISCHARGING WATER FROM A RETENTION PAN

(71) Applicant: SARL LE PRIEURE, Moisy (FR)

(72) Inventor: Raphael Lame, Moisy (FR)

(73) Assignee: SARL LE PRIEURE, Moisy (FR)

( * ) Notice: Subject to any disclaimer, the term of this patent is extended or adjusted under 35 U.S.C. 154(b) by 0 days.

(21) Appl. No.: 14/088,253

(22) Filed: Nov. 22, 2013

(65) Prior Publication Data
US 2014/0151395 A1 Jun. 5, 2014

(30) Foreign Application Priority Data

Nov. 23, 2012 (FR) ...................................... 12 61193

(51) Int. Cl.
| | | |
|---|---|---|
| *B67D 1/00* | (2006.01) | |
| *B65D 47/40* | (2006.01) | |
| *E04D 11/00* | (2006.01) | |
| *E04D 13/04* | (2006.01) | |

(52) U.S. Cl.
CPC .............. *B65D 47/40* (2013.01); *E04D 11/002* (2013.01); *E04D 13/0409* (2013.01); *E04D 2013/0427* (2013.01); *Y02B 80/32* (2013.01)

(58) Field of Classification Search
CPC ...... B65D 47/40; E04D 11/00; E04D 13/006; E04D 17/00; E04D 11/002; E04D 13/0409; E04D 2013/0427
USPC ......... 222/67, 62; 37/578, 577; 137/578, 577, 137/395–398
See application file for complete search history.

(56) References Cited

U.S. PATENT DOCUMENTS

2011/0290341 A1* 12/2011 Lame et al. ................... 137/357

FOREIGN PATENT DOCUMENTS

| DE | 10 46 351 B | 12/1958 |
|---|---|---|
| DE | 10 2007 055451 A1 | 5/2009 |
| EP | 2 141 292 A2 | 1/2010 |
| FR | 1 366 857 A | 7/1964 |
| KR | 20090129724 | 12/2009 |
| WO | WO-2009044927 | 4/2009 |
| WO | WO2010/086369 A1 | 8/2010 |

OTHER PUBLICATIONS

English Translation of European Search Report, dated Jan. 3, 2014, European Application No. 13194280.

* cited by examiner

*Primary Examiner* — Lien Ngo
(74) *Attorney, Agent, or Firm* — Blakely Sokoloff Taylor & Zafman LLP

(57) ABSTRACT

A device for discharging water from an inner space of a temporary water retention tank through a first discharge passage (2), characterized in that it comprises:
 a conduit (1) laid out for ensuring fluidic communication between the inner space and the first discharge passage (2), the conduit (1) having an inner section (12), the surface area of which increases in the direction of flow of the water in the conduit towards the first discharge passage (2) and
 an obturator (3) positioned inside the conduit (1), and controlled so as to be moved inside the conduit (1) according to the water level in the inner space, the displacement of the obturator (3) in the conduit (1) allowing regulation of the leak rate through the first discharge passage (2) regardless of the water level in the inner space between a first level and a second water level.

20 Claims, 4 Drawing Sheets

DEVICE FOR DISCHARGING WATER FROM A RETENTION PAN

FIELD OF THE INVENTION

Figure 1A:
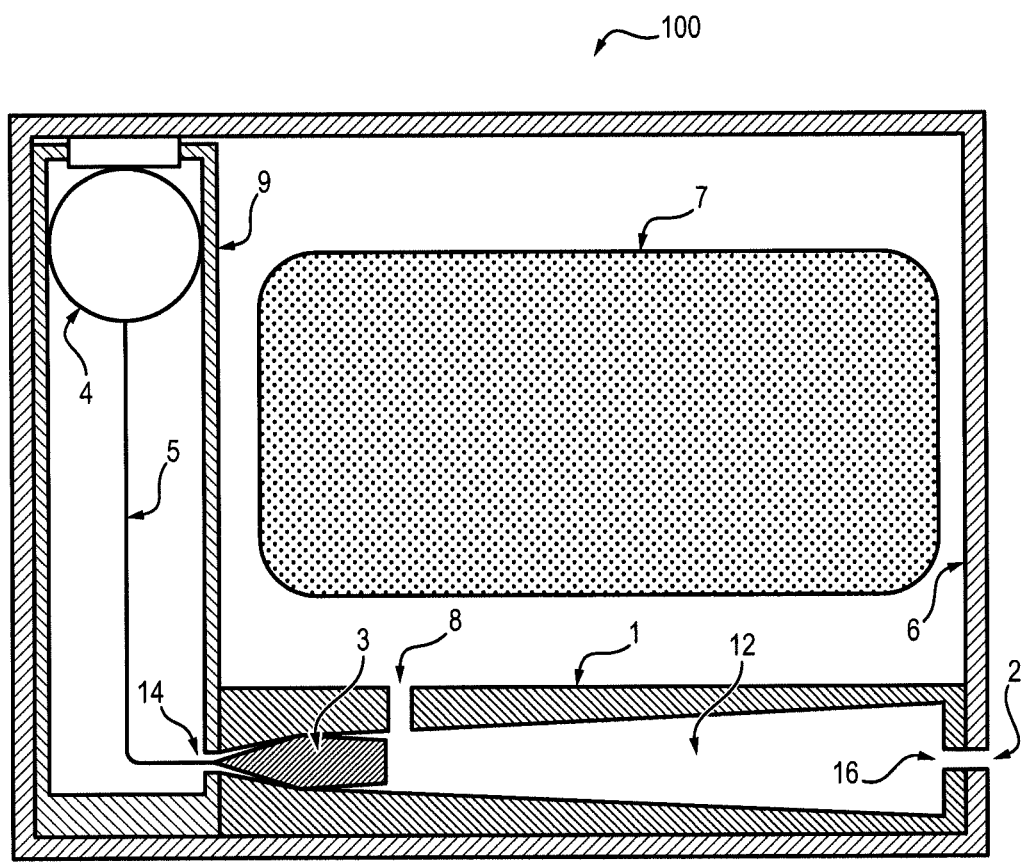

The field of the invention is that of management of rainwaters. The invention more specifically relates to a device for draining water from an inner space of a temporary water retention tank. The invention further relates to a temporary water retention tank having such a device.

STATE OF THE ART

Considering the increasing imperviousness of urban soils and roofs, management of rain waters has become a major concern.

Indeed, rain waters cannot infiltrate waterproof soils or modern roofs. A large portion of rain waters has to be collected and treated. This collection has a financial cost (ducts, retention ponds, water treatment plants), and an ecological cost since the waters are contaminated with many pollutants on their travel (wastes, hydrocarbons, heavy metals . . . ).

Another problem resulting from soil sealing is the increased risk of floods. During severe storms, increasingly significant volumes of rain waters flow, generating clogging of ducts and overflows.

Green roofs provide practical answers to these problems insofar that they provide actual management of rain waters. Green roofs first allow management of infiltration. Green roofs also allow management of the retention of rain waters by playing a buffer role (delay effect) during severe storms. Green roofs thus allow reduction in the runoff flow coefficient (tests show that this coefficient is from 0.4 to 0.6 for a green roof instead of 1 for a waterproof covering).

The present systems of green roofs however have certain limitations. If green roofs allow significant and temporary reduction of runoff flow, the coefficient may be further reduced, on the other hand, the leak flow rate is difficult to control. Further, green roofs reduce the yearly average runoff flow coefficient by about 50%, but they do not ensure systematic reduction of each rain event. Indeed the runoff flow coefficient is not actually under control but substantially varies depending on the characteristics of the rain event and on the hydric condition of the green roof. Thus, a green roof already saturated by previous rains will have a runoff flow coefficient quasi equal to 1 and zero delay effect, which is expressed by a non-reduced leak flow rate and never constant in every case.

Water-storing roofs which are not necessarily vegetated have been developed for reducing very strongly and controlling the runoff flow coefficient. These storing roofs ensure temporary retention of rain waters in order to discharge them according to a certain leak rate spread out over time. However the corresponding leak rates are not constant depending on the height level of stored water and these storing roofs do not either allow systematic reduction of each rain event if the latter are close to each other in time.

Documents EP 1 044 599 B1 and WO 2010/086369 A1 show elements which give the possibility of meeting the requirements of revegetation and control of rain waters of roofs and in particular sloped roofs. However the described elements are not necessarily easy to install in the already existing pans. Moreover, better regulation of the water flow rate would be desirable. Further, management of regulation and possible overflow involves complex parts to be made and applied.

SUMMARY OF THE INVENTION

An object of the invention is to overcome at least one of these problems. An object is in particular to improve temporary retention of rain waters on roofs by improving control of the leak rate.

For this purpose, the invention proposes, according to a first aspect, a device for discharging water from an inner space of a temporary water retention tank through a first discharge passage, characterized in that it comprises:
- a conduit laid out for ensuring fluidic communication between the inner space and the first discharge passage, the conduit having an inner section, the surface area of which increases in the flow direction of the water in the conduit towards the first discharge passage and
- an obturator positioned inside the conduit and controlled so as to be moved inside the conduit depending on the water level in the inner space, the displacement of the obturator in the conduit giving the possibility of regulating the leak rate through the first discharge passage regardless of the water level in the inner space between a first level and a second water level.

The invention is advantageously completed by the following characteristics, taken alone or in any of their technically possible combinations:
- the inner section of the conduit is cone-shaped,
- the obturator is connected to a float, the height of the float being determined by the water level in the inner space and controlling the position of the obturator,
- the obturator is connected to the float through a wire connection crossing the conduit,
- a guide along which the float moves,
- the obturator has a shape mating an open end of the conduit opposite to the first discharge passage, so as to block the flow of water through said end when the water level in the inner space exceeds the first level,
- the conduit has a second passage for discharging the overflow, capable of ensuring fluidic communication between the inner space and the conduit, opening out downstream from said end of the conduit so that the water present in the inner space may flow through the second passage towards the first passage when the obturator blocks the flow of water through said end,
- the regulated leak rate is a constant flow rate regardless of the water level in the inner space between the first level and the second water level,
- the conduit and the obturator are housed in a casing delimiting an inner space and having a third passage connecting the inner space and the intermediate space,
- the third passage is provided with a filter.

According to another aspect, the invention relates to a temporary water retention tank comprising such a water discharge device.

According to another aspect, the invention relates to a water retention system, comprising a revegetation pan, the revegetation pan being:
- conformed for fitting into a temporary water retention pan, or
- made in the same material with a temporary water retention pan the temporary water retention pan comprising such a device for discharging water.

SHORT DESCRIPTION OF THE FIGURES

Figure 1B:
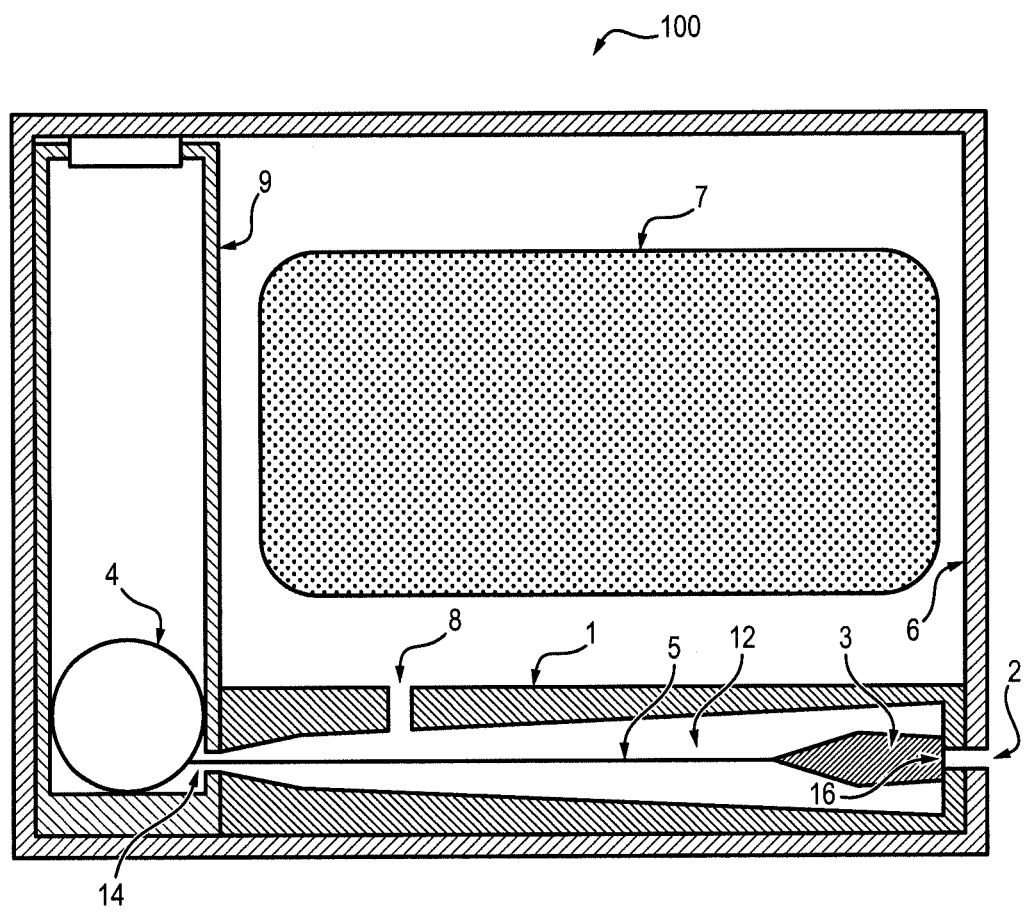
Figure 2:
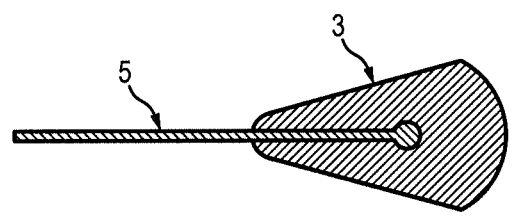
Figure 3:
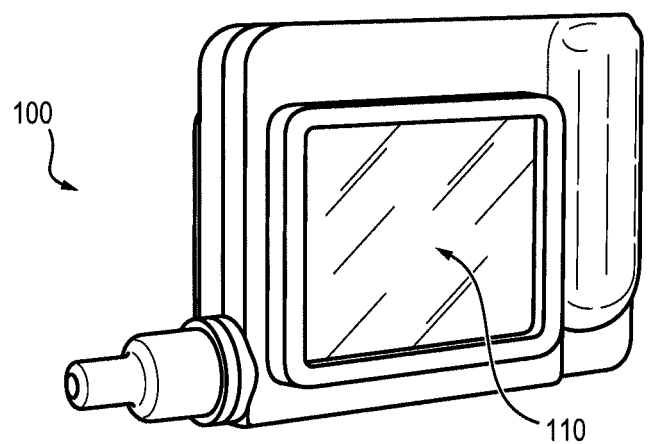
Figure 4:
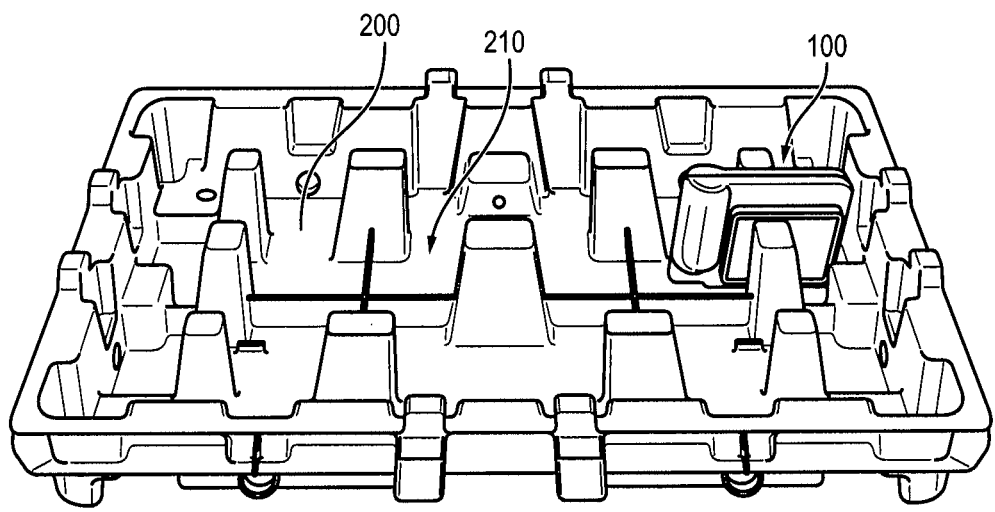
Figure 5:
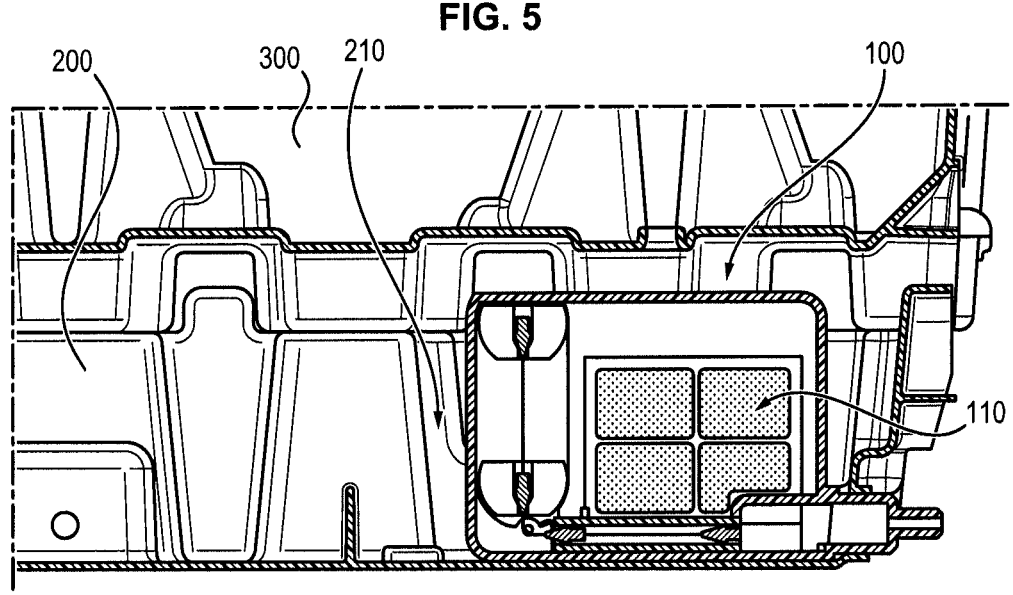

Other features and advantages of the invention will become better apparent upon reading the following detailed description of preferred embodiments thereof, given as a non-limiting example, and made with reference to the appended drawings wherein:

FIG. 1a illustrates a sectional view of a water discharge device according to one exemplary embodiment of the invention in a first position, FIG. 1b illustrates a sectional view of the device of FIG. 1a in a second position, FIG. 2 illustrates an obturator of a device according to another exemplary embodiment of the invention, FIG. 3 illustrates a device according to another exemplary embodiment of the invention, FIG. 4 illustrates a water retention pan comprising a water discharge device according to yet another exemplary embodiment of the invention, FIG. 5 illustrates a sectional view of a portion of a structure of pans comprising a water discharge device according to yet another exemplary embodiment of the invention.

DETAILED DESCRIPTION OF THE INVENTION

1. Water Discharge Device

With reference to FIGS. 1a and 1b, a device is described for discharging water from an inner space of a temporary water retention tank, for example a temporary water retention pan through a first discharge passage 2.

1.1. Conduit

The device comprises a conduit 1 laid out for ensuring fluidic communication between the inner space and the first discharge passage 2. Thus the water from the inner space, to which the device is connected, may flow through the conduit 1 in order to reach the first discharge passage 2.

The conduit 1 has an inner section 12, the surface of which increases in the water flow direction in the conduit 1 towards the first discharge passage 2. The water in the conduit 1 stems from the inner space. The inner section 12 of the conduit 1 may be cone-shaped. The conduit 1 may be a tube with a circular, square or triangular inner section and with a rectangular or cylindrical outer section.

The conduit 1 has an open inlet end 14 and an open outlet end 16. The inlet end 14 is positioned opposite to the first discharge passage 2. The inlet end 14 is positioned upstream from the outlet end 16 in the water flow direction. The inlet 14 and outlet 16 ends are positioned on either side of the inner section 12. The inlet end 14 may have a water inlet orifice of the same size as the portion of the adjacent inner section 12. The outlet end 16 may have a water outlet orifice with a smaller size than the portion of the adjacent inner section 12.

The conduit 1 may be positioned substantially horizontally, so that the flow between the inlet end 14 and the outlet end 16 is substantially horizontal when the device is placed in a pan even when the latter is laid on a tilted roof as described in patent WO2010/086369 A1.

The conduit 1 may be made in any inert material, for example in an inert metal material or in plastic material.

1.2. Obturator

The device comprises an obturator 3 positioned inside the conduit 1. The obturator 3 is controlled so as to be displaced inside the conduit 1 depending on the water level in the inner space. The obturator 3 may move along the inner section 12 depending on the water level in the inner space.

The displacement of the obturator 3 in the conduit 1 allows regulation of the leak rate through the first discharge passage 2 regardless of the water level in the inner space between a first level and a second water level. Indeed, by controlling the obturator 3, it is possible to adjust the configuration of the flow path of the water according to the water level. In particular, it is thus possible to obtain a constant leak rate through the first discharge passage 2 regardless of the water level, and therefore of the stored water volume, in the inner space between a first level and a second water level. The first level corresponds to the high position of the float 4 (maximum water volume being subject to regulation by the device) described in FIG. 1a. The second water level corresponds to the low position of the float 4 (minimum water level being subject to regulation by the device). By constant flow rate, is meant a stable flow rate to within 5% over the relevant range of water height. FIG. 1a illustrates the device when the water level corresponds to the first water level. FIG. 1b illustrates the device when the water level corresponds to the second water level.

The leak flow rate may be adjusted according to variations brought to the dimensions of the device. Depending on the stored water volume, the leak rate regulated by the system depends on the length of the conduit 1 and on its internal section, as well as on the position of the obturator. Furthermore, the device provides more flexibility as compared with the prior art by giving the possibility of selecting and modifying the desired leak rate according to the length and the section of the conduit 2. In terms of dimensioning of the device relatively to the provided water volume and/or the height of the provided water level, the more the provided water volume to be stored is large, or the larger is the height of the water level, the longer is the conduit 1 and vice versa. In terms of dimensioning of the device relatively to the regulation of the provided leak rate, the lower the provided leak rate, the smaller is the internal section of the inner section 12, and vice versa.

The leak rate is generally less than 5 L/s/ha, preferentially less than 2 L/s/ha. The leak rate is adapted to the building and to its localization, so as to meet the local directives relating to the management of water. The device gives the possibility of ensuring leak rate values as small as 1 L/s/ha or any other greater value.

It will be noted that if the device consisted in a single orifice, the leak rate would not be constant. The flow rate actually decreases gradually as the water height decreases in the pan according to the following mathematical formula:

$$Q = \Omega \times \text{Outlet surface area} \times (2 \times g \times h)^{0.5}$$

wherein Q refers to the leak rate, $\Omega$ is a coefficient related to the geometry of the orifice, g refers to acceleration of gravity and h represents the water height. As an example, between water heights of 100 mm and 10 mm, the flow rate may be divided by three.

The obturator 3 has a shape mating the outlet inlet end 14 of the inside of the conduit 1, opposite to the first discharge passage (2), so as to either block the flow of water through the inlet end 14 when the water level in the inner space exceeds the first level or not totally obturating it and letting through a stream of water thereby ensuring an overflow function. The obturator 3 may have a conical shape. Alternatively, the obturator 3 may have the shape of a drop of water, a spherical shape or a cylindrical shape.

The obturator 3 may consist of this complementary shape or this shape may only be a portion of the obturator 3. Thus, as illustrated in FIGS. 1a and 1b, the obturator 3 may have a conical shape mating the inlet end 14, the conical shape being engaged with a cylindrical shape extending from the base of the conical shape, the cylindrical shape ensuring better stability of the obturator 3 when the latter is subject to a stream of water flowing through the conduit 1.

With reference to FIG. 2, an alternative obturator 3 is described. The obturator 3 illustrated has a conical shape engaged at the base of the conical shape with a rounded shape, the obturator 3 thus having the general shape of a drop of water.

The obturator 3 may thus form a floating shuttle. The obturator 3 may be confined to the inside of the conduit 1.

The obturator 3 may be made in an inert material, for example in plastic material.

The device may be associated with any system for managing waters, for example managing rain waters or irrigation waters, green roofs, water-storing roofs, a temporary tank, in order to allow a controlled and constant leak rate of the thereby stored waters.

1.3. Float

The obturator 3 may be connected to a float 4, the height of the float 4 being determined by the water level in the inner space and controlling the position of the obturator 3. The obturator 3 may be connected to the float 4 through a wire connection 5 crossing the conduit 1. It is thus possible to clear or obturate the conduit 1, for example the inlet end 14, depending on the height of the float 4. The wire connection 5 may for example cross the inlet end 14 of the conduit 1 while forming an angle.

The length of the wire connection 5, the size and/or the shape of the float 4 control the way how the obturator 3 moves in the conduit 1, and subsequently the dead space during the water flow in the conduit 1 and the resulting flow rate. The shape of the float 4 may be selected so as to minimize the dead space at the end of travel, in particular when the float is placed in a closed enclosure such as a casing. The float 4 may be of a spherical, cylindrical, truncated sphere shape suitable for being placed upwards or downwards in an operating position in a tank, or even a disc shape. Thus, the shape of the conduit 1, the shape of the obturator 3 and its wire connection 5 with the float 4 give the possibility of controlling the water flow rate through the first discharge passage 2. In particular, it is thus possible to regulate the flow rate according to the height of the float 4, which itself depends on the water level in the inner space.

The device may further comprise a guide 9 along which the float 4 moves. The guide 9 may be a porous column having an inner diameter slightly greater than the dimensions of the float 4. Alternatively, the guide 9 may be an assembly of rods, for example of parallel rods, the rods limiting the displacement of the float 4 by defining the area in which the float 4 moves according to the water level.

1.4. Overflow Discharge Passage

The conduit 1 may have a second discharge passage 8 for overflow, able to ensure a fluidic communication between the inner space and the conduit, and opening downstream from said inlet end 14 of the conduit 1, so that the water present in the inner space may flow through the second passage 8 towards the first passage 2 when the obturator 3 blocks the flow of water through said end. The second discharge passage 8 may for example comprise an orifice, the diameter of which is for example greater than or equal to 1 cm, opening between the inner section 12 of the conduit 1 and the outside of the conduit 1. Thus, when the water level exceeds the first level, the float 4 is at a height such that by means of the wire connection 5, the obturator 3 will block the flow through the inlet end 14 and maximum flow of the water from the inner space towards the first discharge passage 2 is allowed by the second overflow discharge passage 8 without encountering the obturator 3, which is then upstream along the conduit 1.

The regulated flow and the stream from the overflow are thus discharged through the same discharge passage 2. This alternative is advantageous in that it allows discharge of the particles stemming from vegetation complexes associated with the temporary water retention pan in the building roof. This alternative also proves to be advantageous in that it avoids having to generate in the height of the pan and/or of the device, an overflow orifice, the position of which would vary according to the admissible overload.

1.5. Casing

The conduit 1 and the obturator 3 may be housed in a casing 6. The casing 6 delimits an intermediate space 110 allowing fluidic communication between the space 210, for example defined by the tank or the pan to which the device is connected, and the conduit 1. A third passage 7 may connect the inner space 210 and the intermediate space 110. The displacement of the obturator may then be regulated by the water level in the intermediate space 110 itself depending on the water level in the inner space 210. The casing 6 may thus form a temporary water volume in the intermediate space 110, before flowing through the first discharge passage 2 and obtaining a more accurate regulation of the leak rate.

The elements of the device, such as the conduit 1, the obturator 3, the float 4 and the wire connection 5 may be positioned in the casing 6.

The third passage 7 may be positioned at a lateral side of the casing 6, or at several lateral sides of the casing 6, for example two opposite lateral sides.

One or several filters may be positioned for pre-filtering the water entering the intermediate space 110 and thereby avoid the risks of clogging.

For example, the filters may be positioned at the third passage(s) 7.

The casing 6 may be made in waterproof plastic. The casing 6 is for example a shell.

The fact that the device has filters, in particular that the device appears in a closed casing 6 provided with filters, moreover reduces the risks of clogging and ensures an additional filtering function for the collected waters, for example rain waters, on their collection location, which allows a reduction in turbidity at the source, and a reduction of the pollutant contents which may be filtered, or even removal of certain pollutants which may be filtered out.

1.6. First Discharge Passage

The first discharge passage 2, as illustrated in FIGS. 1a and 1b, may comprise an orifice of the casing 6. The first discharge passage 2 may also comprise an orifice or a discharge passage of the pan positioned downstream of the orifice of the casing 6. The device may be adapted so as to be connected to a discharge passage of the pan located at a side wall or at a bottom of the pan.

With reference to FIG. 3, the first discharge passage 2 may comprise a tube extending from the casing 6, being part of the casing 6 or forming an element distinct from the casing 6, and connecting the conduit 6 with the outside of the casing 6. The tube of the first discharge passage 2 may for example extend from the casing 6 sufficiently so as to be able to cross an orifice of the pan in which it should be laid out, in order to open into the outside of the pan.

2. Water Retention Tank and System

With reference to FIGS. 4 and 5, a temporary water retention tank is described comprising a water discharge device 100 as described earlier.

The device 100 may be secured at the bottom of the tank with different systems of clips, through a receptacle molded at the bottom of the tank, or by a guide for example an orifice into which a portion of the device 100 will fit in. This may for example be an orifice of the tank in which a tube of the device 100 forming a first discharge passage 2 will be inserted.

With reference to FIG. 4, the discharge device is positioned at the bottom of a tank. The tank is for example a sub-pan 200 for temporary storage of rain waters, as described in WO 2010/086369 A1. Such a device is thus placed for 4 to 8 storage sub-pans which communicate with each other. The sub-pans 200 may for example be positioned side by side, the device 100 being positioned in the sub-pan 200 located at the border of the assembly of sub-pans, in a position corresponding to the bottom point of the slope of the assembly, if there is a slope and in such a way that the conduit 1 is orthogonal to the slope.

Thus the sub-pan 200 may be of a substantially rectangular shape.

The dimensions of the bottom may be small relatively to the dimensions of a roof on which the sub-pan 200 is intended to be positioned. More particularly, the benefit of pans of small dimensions is to be able to distribute the mass of water homogeneously over the surface of the whole of the roof. Indeed, all the pans will systematically and automatically bear the same mass, at the slope bottom like at the slope top.

The surface area of the solid bottom is for example less than 2 $m^2$, preferably less than 1 $m^2$. As an example, the bottom is rectangular and has a measured length of 60 centimeters and a measured width of 40 centimeters.

Alternatively, the sub-pan 200 may comprise an overflow orifice (not shown) for discharging excess water, distinct from the first discharge passage, positioned on a side wall of the sub-pan 200, in height relatively to the device 100.

The sub-pan 200 is preferably made in an inert and unalterable material, in plastic for example.

With reference to FIG. 5, the device 100 and the sub-pan 200 may be surmounted with a revegetation pan 300, for example a precultivated pan as described in WO 2010/086369 A1 or like the Hydropack™ described in EP 10 445 99 B1 or any other system, such as plates or a coating, giving the possibility of superposing therein other forms of roof, for example gravel or revegetation, for example carpets or intensive revegetation systems.

The orifice of the sub-pan 200 corresponding to the first discharge passage 2 for the water which has flowed via the device 100 may be positioned at a certain distance from the bottom of the sub-pan 200, through a side wall. Alternatively, it is also possible to provide one or several partitions (not shown) from the bottom of the sub-pan 200 and extending over a smaller height than that of the side wall, the portion(s) dividing the sub-pan 200 into one or several regions, at least one of which is not connected to the water discharge means and may thus form a water reserve. Stagnating water is then available for plants of a green vegetation complex of the revegetation pan 300. Synthetic tufts attached to the bottom of the revegetation pan 300 or of the sub-pan 200 and crossing a vegetation support through drainage orifices, may be connected to a hydrophilic membrane allowing hydric exchange with a substrate of the plants and the revegetation complex located above by capillarity.

In addition to controlling the leak rate, the sub-pan 200 and the associated revegetation pan 300 may also actually allow management of infiltration by providing the use of a vegetation complex. A portion of the rain waters may thus be absorbed by the vegetation complex and then sent back into the atmosphere by evaporation-transpiration, which allows a sharp reduction in infiltration.

The rain waters which are not absorbed by the vegetation complex, as for them, flow down into the sub-pan 200 where the leak rate of this excess water will be regulated by the device.

A water retention system may comprise the sub-pan 200 having the device 100 and the revegetation pan 300, the latter being conformed so as to fit into each other.

According to an alternative (not shown), the water retention system may comprise a pan with a double bottom in a single part forming the sub-pan 200 having the device 100 and the revegetation pan 300. The sub-pan 200 may then be made in the same material with the revegetation pan 300.

The exemplary embodiments described are intended to cover alternatives, modifications and equivalents, which are included within the spirit and scope of the invention as defined by the appended claims. Further, in the detailed description of the exemplary embodiments, many specific details are discussed in order to provide a detailed understanding of the claims of the invention. However one skilled in the art will understand that various embodiments may be put into practice without the specific details.

Although the features and the elements of the present examples of the present exemplary embodiments are described in the embodiments in particular combinations, each feature or element may be used alone without the other features and elements of the embodiments or in various combinations with or without other features and elements shown herein.

This written description uses examples of the object shown in order to allow anyone skilled in the art to put into practice the aforesaid, including by making and by using any devices or systems and by applying any incorporated methods. The patentable scope of the object is defined by the claims, and may comprise other examples which will become apparent to those skilled in the art. These other examples are intended to be within the scope of the claims.

The invention claimed is:

1. A device for discharging water from an inner space of a temporary water retention tank through a first discharge passage, comprising:
   a conduit laid out for ensuring fluidic communication between the inner space and the first discharge passage, the conduit having an inner section, the surface area of which increases in the direction of flow of the water in the conduit towards the first discharge passage and
   an obturator positioned inside the conduit and controlled so as to be moved inside the conduit according to the water level in the inner space, the displacement of the obturator in the conduit giving the possibility of regulating the leak flow rate through the first discharge passage regardless of the water level in the inner space between a first level and a second water level,
wherein the obturator is connected to a float, the height of the float being determined by the water level in the inner space and controlling the position of the obturator.

2. The device according to claim 1, wherein the inner section of the conduit is of a conical shape.

3. The device according to claim 1, wherein the obturator is connected to the float through a wire connection crossing the conduit.

4. The device according to claim 1, further comprising a guide along which the float moves.

5. The device according to claim 1, wherein the obturator has a shape mating an open end of the conduit opposite the first discharge passage, so as to block the flow of water through said end when the water level in the inner space exceeds the first level.

6. The device according to claim 5, wherein the conduit has a second overflow discharge passage capable of ensuring fluidic communication between the inner space and the conduit, opening downstream from said end of the conduit so that the water present in the inner space may flow through the second passage towards the first passage when the obturator blocks the flow of water through said end.

7. The device according to claim 1, wherein the regulated leak rate is a constant flow rate regardless of the water level in the inner space in the first level and the second water level.

8. The device according to claim 1, wherein the conduit and the obturator are housed in a casing delimiting an intermediate space and having a third passage connecting the inner space and the intermediate space.

9. The device according to claim 8, wherein the third passage is provided with a filter.

10. A temporary water retention tank comprising a water discharge device according to claim 1.

11. A water retention system, comprising a temporary water retention pan and a revegetation pan, the revegetation pan being:
  conformed so as to fit into the temporary water retention pan,
  the temporary water retention pan comprising a device for discharging water from an inner space of a temporary water retention tank through a first discharge passage, comprising:
  a conduit laid out for ensuring fluidic communication between the inner space and the first discharge passage, the conduit having an inner section, the surface area of which increases in the direction of flow of the water in the conduit towards the first discharge passage and
  an obturator positioned inside the conduit and controlled so as to be moved inside the conduit according to the water level in the inner space, the displacement of the obturator in the conduit giving the possibility of regulating the leak flow rate through the first discharge passage regardless of the water level in the inner space between a first level and a second water level.

12. A device for discharging water from an inner space of a temporary water retention tank through a first discharge passage, comprising:
  a conduit laid out for ensuring fluidic communication between the inner space and the first discharge passage, the conduit having an inner section, the surface area of which increases in the direction of flow of the water in the conduit towards the first discharge passage and
  an obturator positioned inside the conduit and controlled so as to be moved inside the conduit according to the water level in the inner space, the displacement of the obturator in the conduit giving the possibility of regulating the leak flow rate through the first discharge passage regardless of the water level in the inner space between a first level and a second water level,
  wherein the obturator has a shape mating an open end of the conduit opposite the first discharge passage, so as to block the flow of water through said end when the water level in the inner space exceeds the first level.

13. The device according to claim 12, wherein the conduit has a second overflow discharge passage capable of ensuring fluidic communication between the inner space and the conduit, opening downstream from said end of the conduit so that the water present in the inner space may flow through the second passage towards the first passage when the obturator blocks the flow of water through said end.

14. A temporary water retention tank comprising a water discharge device according to claim 12.

15. A water retention system, comprising a temporary water retention pan and a revegetation pan, the revegetation pan being:
  conformed so as to fit into the temporary water retention pan,
  the temporary water retention pan comprising a water discharge device according to claim 12.

16. A device for discharging water from an inner space of a temporary water retention tank through a first discharge passage, comprising:
  a conduit laid out for ensuring fluidic communication between the inner space and the first discharge passage, the conduit having an inner section, the surface area of which increases in the direction of flow of the water in the conduit towards the first discharge passage and
  an obturator positioned inside the conduit and controlled so as to be moved inside the conduit according to the water level in the inner space, the displacement of the obturator in the conduit giving the possibility of regulating the leak flow rate through the first discharge passage regardless of the water level in the inner space between a first level and a second water level,
  wherein the conduit and the obturator are housed in a casing delimiting an intermediate space and having a third passage connecting the inner space and the intermediate space.

17. The device according to claim 16, wherein the third passage is provided with a filter.

18. A temporary water retention tank comprising a water discharge device according to claim 16.

19. A water retention system, comprising a temporary water retention pan and a revegetation pan, the revegetation pan being:
  conformed so as to fit into the temporary water retention pan, or
  is made in the same material with the temporary water retention pan,
  the temporary water retention pan comprising a water discharge device according to claim 16.

20. The device defined by claim 16, wherein the conduit has a second overflow discharge passage capable of ensuring fluidic communication between the inner space and the conduit, opening downstream from said end of the conduit so that the water present in the inner space may flow through the second passage towards the first passage when the obturator blocks the flow of water through said end.

* * * * *